United States Patent [19]

Walker

[11] 4,053,422
[45] Oct. 11, 1977

[54] DRILLING FLUIDS CONTAINING POLYETHOXYLATED TETRAALKYL ACETYLENIC DIOLS

[75] Inventor: Thad O. Walker, Houston, Tex.
[73] Assignee: Texaco Inc., New York, N.Y.
[21] Appl. No.: 696,661
[22] Filed: June 16, 1976
[51] Int. Cl.$^2$ .............................................. C09K 7/02
[52] U.S. Cl. ............................... 252/8.5 C; 252/48.2; 252/49.3; 252/52 A
[58] Field of Search ................ 252/8.5 C, 8.5 P, 48.2, 252/49.3, 52 R, 52 A

[56] References Cited

U.S. PATENT DOCUMENTS

| 3,027,324 | 3/1962 | Rosenberg | 252/8.5 |
|---|---|---|---|
| 3,284,352 | 11/1966 | Burdyn et al. | 252/8.5 |
| 3,819,522 | 6/1974 | Zmoda et al. | 252/89 |
| 3,822,299 | 7/1974 | Lukeman et al. | 252/48.6 X |

OTHER PUBLICATIONS

McCutcheon's Detergents and Emulsifiers, 1969, p. 243.

Primary Examiner—Herbert B. Guynn
Attorney, Agent, or Firm—Thomas H. Whaley; Carl G. Ries; James F. Young

[57] ABSTRACT

Aqueous drilling fluids containing a minor amount of polyethoxylated tetraalkyl acetylenic diols. Such fluids are especially useful where reduced torque drilling fluids are needed. Another embodiment of this invention relates to a method of drilling utilizing the above-described fluids.

22 Claims, No Drawings

DRILLING FLUIDS CONTAINING POLYETHOXYLATED TETRAALKYL ACETYLENIC DIOLS

This invention relates to aqueous drilling fluids. More particularly, this invention relates to aqueous drilling fluids having incorporated therein a minor amount of a polyethoxylated tetraalkyl derivative of an acetylenic diol as hereinafter more fully described. In another embodiment this invention is directed to an improved driling operation employing the modified drilling fluids described above.

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonite clay, to impart desirable viscosity and gel strength properties to the drilling fluid so as to better enable the drilling fluid to carry away the drilling cuttings from the bottom of the borehole. Other materials such as weighting agents, e.g., barium sulfate, are employed to increase the density of the drilling fluid so as to make the drilling operation more effective and safer by overcoming the fluid pressure within the formation being drilled. Other materials such as water loss improving agents, e.g., carboxymethylcellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

Although a wide variety of aqueous drilling fluids containing materials designed to increase the lubricity of these fluids have been proposed and used in the field, all of these modified drilling fluids suffer from one or more disadvantages.

In accordance with this invention an improved aqueous drilling fluid is provided by incorporating therein a minor amount of a water soluble or water dispersible polyethoxylated derivative of a tetraalkyl substituted decynediol wherein the number of ethoxy groups therein can vary from about 3.5 up to about 30. More specifically the polyethoxylated, tetraalkyl substituted decynediol is a polyethoxylated 2, 4, 7, 9-tetramethyl - 5 - decyne - 4 - 7 - diol containing an average of from 3.5 to 30 moles of ethylene oxide.

A drilling fluid of this invention may be prepared by the addition of a minor amount of a polyethoxylated tetraalkyl decynediol described above to an aqueous drilling fluid or to an aqueous drilling fluid containing a clay dispersed therein.

Polyethoxylated tetraalkyl decynediols of the type described above are available commercially from Air Products and Chemicals, Inc., Allentown, Pa., for example under the trade designations Surfynols 440, 465 and 485. The amount of the polyethoxylated tetraalkyl decynediol added to the well drilling fluid may be only a minor but sufficient amount to substantially increase the lubricity of the said drilling fluid as measured, for example, by torque reduction. The amount to be added to the well drilling fluid is in the range of from about 0.5 to about 5 pounds thereof, per barrel of drilling fluid, preferably from about 1 to about 3 pounds per barrel.

It has been found that the drilling fluids of the present invention exhibit a high degree of lubricity and little or no abnormal distortion of mud properties. Moreover the novel drilling fluids do not generate an abnormal amount of foam, so that any foaming can be controlled by the use of conventional defoamers which are compatible with drilling fluid systems. The novel drilling fluids of this invention show tolerance and stability over wide ranges in pH and electrolyte concentrations and they perform satisfactorily in the various mud systems (i.e. drilling fluid systems) in general use today, e.g. low and high pH, salt water, as well as nondispersed and inhibitive type mud systems.

The polyoxyethylated tetraalkyl decynediol compounds employed as lubricity additives in the present invention may be sulfurized. For example, sulfurized products having a sulfur content of 1 to 8% by weight, particularly 2 to 6% by weight, of the polyoxyethylated tetraalkyl decynediol are effective.

Sulfurization of the compounds employed as lubricity additives in the present invention was accomplished by a known method, heating the polyethoxylated tetraalkyl decynediol to a temperature in the range of from about 150°–200° C and adding thereto slowly the requisite amount of elemental sulfur and maintaining the resulting heated admixture at the prescribed temperature for approximately two hours followed by a cooling period to let the sulfurized product reach room temperature. This product was used.

An aqueous drilling fluid was used as the Base Mud. This mud was a top-hole mud from the West Cote Blanche Bay Field, St. Mary Parish, La., which was treated with 6 lbs/bbl of the ferrochrome lignosulfonate dispersant "Q-Broxin", its pH raised with caustic to 9.5, and aged overnight at 150° F before use.

There was added thereto varying amounts of the polyethoxylated tetraalkyl decynediols as well as the sulfurized analogs thereof. The physical properties of the resultant drilling fluids in terms of lubricity were measured using a lubricity test machine described herein below.

TEST PROCEDURE

A machine was designed to simulate borehole conditions. The torque on a steel shaft rotating in a formation type core in the presence of a circulating drilling fluid was measured.

The torque produced by dry friction is considered be linearly dependent on the normal force independent of velocity area, and fluid properties such as plastic viscosity and yield point.

Viscous friction is caused by viscous drag of the shaft rotating in the circulating mud system. This type of drag is proportional to the surface area; velocity, and film thickness which together can be considered on the velocity gradient; and depends on fluid properties such as plastic viscosity and yield point. Viscous drag is dependent on the normal force only in an indirect manner through its effect on the film thickness. That is, increasing the normal force decreases the film thickness which in turn increases the velocity gradient thus increasing the required torque.

The major components of the test machine consist of a steel shaft turned by a cradle mounted motor with a Zero-Max (0–800 ppm) speed control, and a swivel mounted core. The motor was arranged so torque readings could be taken on a spring scale attached to the end of a lever arm.

The core is mounted on a bracket which pivots about a stationary point on one end. A cable is attached to the other end of the bracket. This cable runs over a pulley and weights are hung on the end. From a balance of moments and forces, the load on the pulley or applied load can be related to the load on the shaft or the normal force holding the shaft and core in contact.

The torque-load relation for the machine is linear. Thus the dry friction model adequately describes the process under consideration, and the change of the coefficient of friction between the base mud and the treated mud runs gives an indication of the lubricity effectiveness of the material under consideration.

The results obtained are reported as % reduction in torque.

The test results obtained were recorded and are summarized in the following table.

TABLE

| Example Number | Amount of Additive lbs/bbl | % Torque Reduction |
| --- | --- | --- |
| — Base Mud | — | — |
| 1. Surfynol 440[(2)] | 1 | 22.5 |
| 2. Surfynol 440 | 2 | 22.7 |
| 3. Surfynol 465[(3)] | 1 | 13.3 |
| 4. Surfynol 465 | 2 | 15.3 |
| 5. Surfynol 485[(4)] | 1 | 6.1 |
| 6. Surfynol 485 | 2 | 12.1 |
| 7. Sulfurized (6%) Surfynol 440 | 1 | 16.4 |
| 8. Sulfurized (6%) Surfynol 440 | 2 | 27.6 |
| 9. Sulfurized (6%) Surfynol 465 | 1 | 22.2 |
| 10. Sulfurized (6%) Surfynol 465 | 2 | 26.9 |
| 11. Sulfurized (6%) Surfynol 485 | 1 | 17.5 |
| 12. Sulfurized (6%) Surfynol 485 | 2 | 20.6 |

[(1)]a low pH aqueous drilling fluid as previously described.
[(2)]Surfynol 440 - 2, 4, 7, 9 - tetramethyl -5 -decyne - 4 - 7 - diol ethoxylated with 3.5 moles of ethyleneoxide.
[(3)]Surfynol 465 - 2, 4, 7, 9 - tetramethyl - 5 - decyne - 4 - 7 - diol ethoxylated with 10 moles of ethylene oxide.
[(4)]Surfynol 485 - 2, 4, 7, 9 - tetramethyl - 5 - decyne - 4 - 7 - diol ethoxylated with 30 moles of ethylene oxide.

Inspection of the data in the above table show that the additives of the present invention are effective lubricity additives as demonstrated by the Percentage Reductions in Torque obtained therewith. In particular excellent results are shown for the compositions of Examples 1 and 2 wherein reductions of 22.5 and 22.7% respectively are attained. The sulfurized compositions of Examples 9 and 10 also show excellent results.

I claim:

1. An aqueous drilling fluid containing in the aqueous phase clay solids dispersed therein by a ferrochrome lignosulfonate dispersant and containing a polyethoxylated tetramethyl decynediol or a sulfurized polyoxyethylated tetramethyl decynediol wherein the number of ethylene oxide groups therein is on an average of from 3.5 to about 30, said decynediol being present in said drilling fluid in an amount of from about 0.5 to about 5 pounds per barrel.

2. An aqueous drilling fluid as claimed in claim 1 wherein said decynediol is present in said aqueous phase in an amount of from about 1 to 3 pounds per barrel.

3. An aqueous drilling fluid as claimed in claim 1 wherein said decynediol is a sulfurized decynediol.

4. An aqueous drilling fluid as claimed in claim 3 wherein the sulfur content varies from about 1 to 8% weight, based on the weight of said decynediol.

5. An aqueous drilling fluid as claimed in claim 4 wherein the sulfur content is from about 2 to 6% by weight, based on the weight of said decynediol.

6. An aqueous drilling fluid as claimed in claim 1 wherein said decynediol is 2, 4, 7, 9 tetramethyl-5-decyne -4-7-diol containing 3.5 moles of ethylene oxide.

7. An aqueous drilling fluid as claimed in claim 6 wherein said decynediol is sulfurized and contains about 6% by weight of sulfur.

8. An aqueous drilling fluid as claimed in claim 1 wherein said decynediol is 2, 4, 7, 9-tetramethyl-5-decyne-4-7-diol containing 10 moles of ethylene oxide.

9. An aqueous drilling fluid as claimed in claim 8 wherein said decynediol is sulfurized and contains about 6% by weight of sulfur.

10. An aqueous drilling fluid as claimed in claim 1 wherein said decynediol is 2, 4, 7, 9-tetramethyl-5-decyne-4-7-diol containing 30 moles of ethylene oxide.

11. An aqueous drilling fluid as claimed in claim 10 wherein said decynediol is sulfurized and contains about 6% by weight of sulfur.

12. In a method of drilling wells wherein a drilling fluid is circulated in the well in contact with an earth formation during the drilling operation, the improvement which comprises contacting said earth formation with an aqueous drilling fluid containing in the aqueous phase clay solids dispersed therein by a ferrochrome lignosulfonate dispersant and containing a polyethoxylated tetramethyl decynediol or a sulfurized polyoxyethylated tetramethyl decynedial wherein the number of ethylene oxide groups therein is on an average of from 3.5 to about 30, said decynediol being present in an amount of from about 0.5 to about 5 pounds per barrel and being effective to reduce the torque of said drilling fluid.

13. A method as claimed in claim 12 wherein said decynediol is present in said aqueous phase in an amount of from about 1 to 3 pounds per barrel.

14. A method as claimed in claim 12 wherein said decynediol is a sulfurized decynediol.

15. A method as claimed in claim 14 wherein the sulfur content varies from about 1 to 8% by weight, based on the weight of said decynediol.

16. A method as claimed in claim 15 wherein the sulfur content is from about 2 to 6% by weight, based on the weight of said decynediol.

17. A method as claimed in claim 12 wherein said decynediol is 2, 4, 7, 9 tetramethyl-5-decyne-4-7-diol containing 3.5 moles of ethylene oxide.

18. A method as claimed in claim 17 wherein said decynediol is sulfurized and contains about 6% weight of sulfur.

19. A method as claimed in claim 12 wherein said decynediol is 2, 4, 7, 9-tetramethyl-5-decyne-4-7-diol containing 10 moles of ethylene oxide.

20. A method as claimed in claim 19 wherein said decynediol is sulfurized and contains about 6% by weight of sulfur.

21. A method as claimed in claim 12 wherein said decynediol is 2, 4, 7, 9-tetramethyl-5-decyne-4-7-diol containing 30 moles of ethylene oxide.

22. A method as claimed in claim 21 wherein said decynediol is sulfurized contains about 6% by weight of sulfur.

* * * * *